US012798035B2

(12) United States Patent
Song et al.

(10) Patent No.: US 12,798,035 B2
(45) Date of Patent: Nov. 17, 2026

(54) BASE FOR PLACING GRINDER

(71) Applicant: Zhuhai Kelitong Electronic Co., Ltd., Zhuhai City (CN)

(72) Inventors: Xiaoxian Song, Zhuhai City (CN); Wei Zhu, Zhuhai City (CN); Haifeng Luo, Zhuhai City (CN)

(73) Assignee: Zhuhai Kelitong Electronic Co., Ltd., Zhuhai (CN)

(*) Notice: Subject to any disclaimer, the term of this patent is extended or adjusted under 35 U.S.C. 154(b) by 720 days.

(21) Appl. No.: 18/224,301

(22) Filed: Jul. 20, 2023

(65) Prior Publication Data

US 2024/0173814 A1 May 30, 2024

(30) Foreign Application Priority Data

Nov. 27, 2022 (CN) ........................ 202223148033.X

(51) Int. Cl.
*B24B 23/02* (2006.01)
*A47J 47/16* (2006.01)
*H02J 7/70* (2026.01)

(52) U.S. Cl.
CPC ............... *B24B 23/02* (2013.01); *A47J 47/16* (2013.01); *H02J 7/731* (2026.01)

(58) Field of Classification Search
CPC ............ B24B 23/02; H02J 7/731; A47J 47/16
See application file for complete search history.

(56) References Cited

U.S. PATENT DOCUMENTS

| | | | | | |
|---|---|---|---|---|---|
| 6,056,217 | A * | 5/2000 | Friden | A47J 42/06 241/135 |
| D1,031,370 | S * | 6/2024 | Song | D7/386 |
| D1,047,573 | S * | 10/2024 | Song | D7/386 |
| D1,100,579 | S * | 11/2025 | Song | D7/412 |
| 2011/0084657 | A1* | 4/2011 | Toya | H02J 7/731 320/108 |
| 2012/0267330 | A1* | 10/2012 | Borodulin | A47J 47/16 211/13.1 |
| 2021/0045513 | A1* | 2/2021 | Cheng | H02J 7/731 |
| 2024/0178465 | A1* | 5/2024 | Xiaoxian | A47J 42/06 |

FOREIGN PATENT DOCUMENTS

| | | | | |
|---|---|---|---|---|
| CN | 2601611 Y | 2/2004 | | |
| CN | 201481160 U | 5/2010 | | |
| CN | 216251529 U | 4/2022 | | |
| CN | 218457968 U | 2/2023 | | |
| DE | 202006020003 U1 * | 9/2007 | | A47J 43/06 |
| KR | 20060126881 A * | 12/2006 | | A61L 2/10 |
| KR | 100791850 B1 * | 1/2008 | | A47J 43/07 |
| KR | 101829023 B1 * | 3/2018 | | A47J 43/06 |

* cited by examiner

*Primary Examiner* — Jared Fureman
(74) *Attorney, Agent, or Firm* — Nitin Kaushik

(57) ABSTRACT

The present invention discloses a base for placing grinders that comprises an upper shell and a lower shell, wherein the upper and lower shells are detachably connected, one or more recesses are provided on one side of the upper shell to place the shell of the grinder, and one or more accommodating compartments are provided on the lower shell to place the bottom of the grinder. A detachable connection between the upper and lower shells enables the lower shell to be dismantled for cleaning after the grinder has been used for a long time.

15 Claims, 2 Drawing Sheets

BASE FOR PLACING GRINDER

CROSS-REFERENCE TO RELATED APPLICATION

This application claims priority to Chinese Patent Application 202223148034.4 filed on Nov. 27, 2022, the entire contents of which are hereby expressly incorporated by reference into the present application.

TECHNICAL FIELD

The present invention generally relates to the technical field of grinders, and in particular to a base for placing grinders.

BACKGROUND

For grinders currently available on the market, one contact charging mode is that a charging contact piece is provided at the lower end of the grinder, and a base with a power supply contact piece is provided, so that when the lower of the grinder is placed on the base, the charging contact piece at the lower end of the grinder contacts the power supply contact piece to charge the grinder.

The defect of the prior art is that since the ground material is discharged from the lower end of the grinder, the bottom of the grinder is in contact with the charging base during charging, and dust in the grinder falls onto the charging piece of the charger, so the charging base is contaminated or dust builds up on it.

In addition, the base for placing grinders provided by the prior art is integral, so it is not easy to open the base to clean its inside.

What is needed is a grinder that addresses any of the shortcomings of the prior art discussed above.

SUMMARY

The present invention provides a base for placing grinders, and its key points are as follows: The base comprises an upper shell and a lower shell, the upper and lower shells are detachably connected, one or more recesses are provided on one side of the upper shell to place the shell of the grinder, and one or more accommodating compartments are provided on the lower shell to place the bottom of the grinder.

Further, it comprises a bottom plate, the bottom plate is provided between the upper and lower shells, and a plurality of columns are provided on the upper side of the bottom plate to realize the connection between the bottom plate and the bottom of the upper shell.

Further, one or more arcs are provided on the bottom plate, and their shapes match the one or more recesses and the one or more accommodating compartments to place the grinder.

Further, the one or more arcs, the one or more recesses and the one or more accommodating compartments are of the same number.

Further, fasteners are provided in the lower part of the bottom plate, catching grooves are provided in the upper surface of the lower shell, and the fasteners and the catching grooves form buckle structures.

Further, the one or more arcs, the one or more recesses and the one or more accommodating compartments are of the same number, being two.

Further, the number of the buckle structures is five.

Further, the two arcs are adjacent to each other and form an approximately W-shaped end when put side by side, and a fastener is provided at each endpoint of the approximately W-shaped end.

Further, the positions of the catching grooves correspond to those of the fasteners, so that the positions of the one or more arcs, the one or more recesses and the one or more accommodating compartments are aligned, and the space formed by the one or more arcs, the one or more recesses and the one or more accommodating compartments is used to place the shell of the grinder.

The present invention realizes the following function: It realizes detachment between the upper and lower shells by dismantling the lower shell after the grinder has been used for a long time to remove or clean the dust in the one or more accommodating compartments or base.

These and other aspects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof. It is hereby disclosed that the invention includes all such modifications.

Where: 1) upper shell; 2) lower shell; 3) one or more recesses; 4) one or more accommodating compartments; 5) bottom plate; 6) columns; 7) one or more arcs; 8) fasteners; 9) catching grooves; 10) approximately W-shaped end.

DETAILED DESCRIPTION

Figure 1:
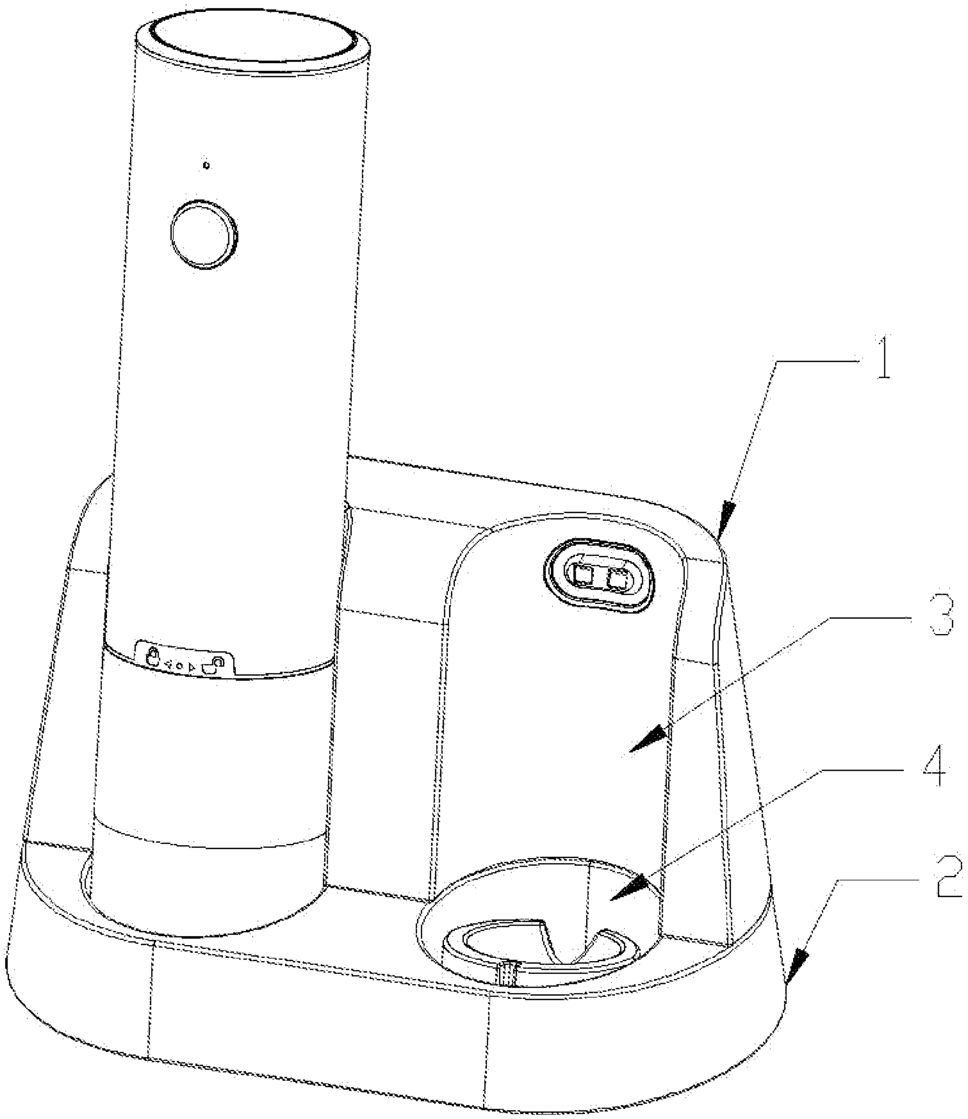
FIG. 1 is a schematic diagram of a grinder inserted into the base.
Figure 2:
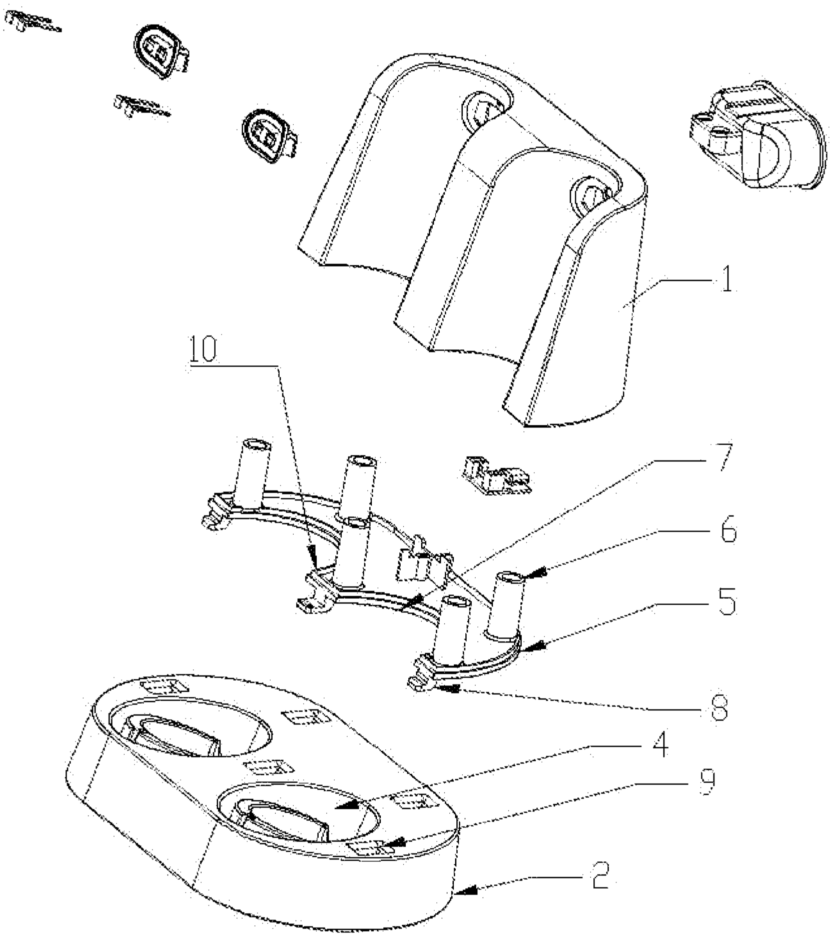
FIG. 2 is an exploded view of the present invention.

A base for placing grinders as shown in FIG. 1 and FIG. 2 comprises an upper shell 1 and a lower shell 2, wherein the upper shell 1 and the lower shell 2 are detachably connected, and are connected by a buckle in the present embodiment. one or more recesses 3 are provided on one side of the upper shell 1 to place the shell of the grinder, and one or more accommodating compartments 4 are provided on the lower shell 2 to place the bottom of the grinder. A bottom plate 5 is provided between the upper shell 1 and the lower shell 2, and a plurality of columns 6 are provided on the upper side of the bottom plate. A plurality of screws are provided on upper shell 1, and the bottom plate 5 can be connected with the bottom of the upper shell 1 by screw connection by inserting the screws into the columns 6.

Fasteners 8 are provided on the side of the bottom plate 5 close to the lower shell 2, catching grooves 9 are provided on the side of the lower shell 2 close to the bottom plate 5, the ends of the fasteners 8 are inserted into the catching grooves 9, and the fasteners 8 and the catching grooves 9 form buckle structures, realizing a detachable buckle connection between the upper shell 1 and the lower shell 2. Through the detachable connection between the fasteners 8 and the catching grooves 9, a detachable connection is realized between the upper shell 1 and the lower shell 2. Based on the user's need, when dust builds up to a certain extent in the base, the lower shell 2 may be dismantled to remove or clean the dust in the base or one or more accommodating compartments. In addition, the circuit-related structures in the upper shell 1 can be protected from water contact.

Two positions for placing grinders are provided in the present embodiment as follows: one or more arcs 7 for containing grinder shells are provided on the bottom plate 5, where each are contains one grinder shell. The shape of an are 7 matches the shapes of the corresponding recess 3 and the corresponding accommodating compartment 4, and they form a space for placing the grinder together.

Fasteners 8 are provided in the lower part of the bottom plate 5, catching grooves 9 are provided in the upper surface of the lower shell 2, and the fasteners 8 can be inserted into the catching grooves 9 to form buckle structures. There are five fasteners 8 and five catching grooves 9 to improve the stability of the buckle connection.

The one or more arcs 7, the one or more recesses 3 and the one or more accommodating compartments 4 are of the same number. In the present embodiment, there are two arcs 7, two recesses 3 and two storage compartments 4, so that one base can place two grinders concurrently. The two arcs 7 are adjacent to each other and form an approximately W-shaped end 10 when put side by side, a fastener 8 is provided at each endpoint of the approximately W-shaped end 10, and the positions of the catching grooves 9 at the lower shell 2 correspond to those of the fasteners 8, so that the positions of the one or more arcs 7, the one or more recesses 3 and the storage compartments 4 are aligned, and the space formed by them can finally place grinder shells.

In addition, the present embodiment provides a charging base that charges electric grinders, wherein charging terminals are provided on one side of the grinder shell, and power supply terminals are provided on one side of the one or more recesses (3), so that when the grinder is placed on the base, the charging and power supply terminals are electrically connected and charge the grinder.

In sum, the present invention provides a base for placing grinders, wherein the upper shell 1 and the lower shell 2 are detachably connected, and a detachable connection between the upper and lower shells enables the lower shell to be dismantled for cleaning after the grinder has been used for a long time.

The above detailed description is for a feasible embodiment of the present invention, and this embodiment is not intended to restrict the protection scope of the present invention. Any equivalent embodiment or change not deviating from the essence of the present invention should be included in the protection scope of the present invention.

It should be noted that for those ordinarily skilled in the art, some transformations and improvements can be made without departing from the conception of the present invention, all of which are within the scope of protection of the present invention. Therefore, the scope of protection of the present invention should be based on the attached claims.

It should also be understood that the components of the system and associated components may be made of any number of different materials and in many different shapes.

Additionally, it should be understood that the various inventive features described above can each be used independently of one another or in combination with other features.

It is appreciated that many changes and modifications could be made to the invention without departing from the spirit thereof. Some of these changes will become apparent from the appended claims. It is intended that all such changes and/or modifications be incorporated in the appending claims.

What is claimed is:

1. A base for placing a grinder comprising:

an upper shell having a first side and one or more recesses on the first side configured to receive a grinder; and a lower shell detachably connected to the upper shell, the lower shell having one or more accommodating compartments configured to receive a bottom of the grinder;

a bottom plate provided between the upper shell and the lower shell; and a plurality of columns provided on an upper side of the bottom plate configured to connect the bottom plate with the bottom of the upper shell;

wherein the lower part of the bottom plate further comprises at least one fastener;

wherein the upper surface of the lower shell further comprises at least one catching groove;

wherein the end of the at least one fastener is inserted into the at least one catching groove; and wherein the at least one fastener and the at least one catching groove form buckle structures.

2. The base for placing a grinder according to claim 1, wherein the bottom plate further comprises one or more arcs;

wherein a curvature of the one or more arcs is substantially the same of a curvature of the one or more recesses and a curvature of the one or more accommodating compartments.

3. The base for placing a grinder according to claim 2, wherein the curvatures are configured to receive the grinder.

4. The base for placing a grinder according to claim 2, wherein the one or more arcs, the one or more recesses, and the one or more accommodating compartments are of the same number.

5. The base for placing a grinder according to claim of claim 2, wherein the one or more arcs comprise two arcs;

wherein the two arcs are adjacent to each other and form an approximately W-shaped end when put side by side; and wherein the at least one fastener comprises a first fastener provided at one endpoint of the approximately W-shaped end and second fastener provided at the other endpoint.

6. The base for placing a grinder according to claim 5, wherein the number of the buckle structures is five.

7. The base for placing a grinder according to claim of claim 6, wherein the one or more arcs comprise two arcs;

wherein the two arcs are adjacent to each other and form an approximately W-shaped end when put side by side; and wherein the at least one fastener comprises a first fastener provided at one endpoint of the approximately W-shaped end and second fastener provided at the other endpoint.

8. The base for placing a grinder according to claim 7, wherein the positions of the catching grooves correspond to those of the fasteners, so that the positions of the one or more arcs, the one or more recesses, and the one or more accommodating compartments are aligned; and wherein the space formed by the one or more arcs, the one or more recesses, and the one or more accommodating compartments is used to place a shell of the grinder.

9. The base for placing a grinder according to claim 8, further comprising at least one charging terminal provided on one side of the shell of the grinder; and a plurality of power supply terminals is provided on one side of the one or more recesses, so that when the grinder is placed on the base, the charging and power supply terminals are electrically connected and charge the grinder.

10. The base for placing a grinder according to claim 5, wherein the positions of the catching grooves correspond to those of the fasteners, so that the positions of the one or more arcs, the one or more recesses, and the one or more accommodating compartments are aligned; and wherein the space formed by the one or more arcs, the one or more recesses, and the one or more accommodating compartments is used to place a shell of the grinder.

11. The base for placing a grinder according to claim 10, further comprising at least one charging terminal provided on one side of the shell of the grinder; and a plurality of power supply terminals is provided on one side of the one or more recesses, so that when the grinder is placed on the base, the charging and power supply terminals are electrically connected and charge the grinder.

12. The base for placing a grinder according to claim 2, wherein the one or more arcs comprise first and second arcs;

wherein the one or more recesses comprise first and second recesses; and wherein the one or more accommodating compartments comprise first and second accommodating compartments.

13. The base for placing a grinder according to claim of claim 12, wherein the one or more arcs comprise two arcs;

wherein the two arcs are adjacent to each other and form an approximately W-shaped end when put side by side; and wherein the at least one fastener comprises a first fastener provided at one endpoint of the approximately W-shaped end and second fastener provided at the other endpoint.

14. The base for placing a grinder according to claim 13, wherein the positions of the catching grooves correspond to those of the fasteners, so that the positions of the one or more arcs, the one or more recesses, and the one or more accommodating compartments are aligned; and wherein the space formed by the one or more arcs, the one or more recesses, and the one or more accommodating compartments is used to place a shell of the grinder.

15. The base for placing a grinder according to claim 14, further comprising at least one charging terminal provided on one side of the shell of the grinder; and a plurality of power supply terminals is provided on one side of the one or more recesses, so that when the grinder is placed on the base, the charging and power supply terminals are electrically connected and charge the grinder.

* * * * *